United States Patent
Meeks et al.

[11] Patent Number: 6,093,990
[45] Date of Patent: Jul. 25, 2000

[54] COVERING DEVICE FOR TOTALLY ENCLOSED FAN COOLED MOTORS

[76] Inventors: David S. Meeks; Paul S. Meeks, both of 280 S. Third St., Columbus, Ohio 43215

[21] Appl. No.: 09/412,716

[22] Filed: Oct. 5, 1999

[51] Int. Cl.[7] .................................................... H02K 5/00
[52] U.S. Cl. ................................ 310/91; 310/88; 310/89; 310/85; 310/66; 310/59
[58] Field of Search ................................. 310/91, 88, 89, 310/85, 59, 66

[56] References Cited

U.S. PATENT DOCUMENTS

| | | | |
|---|---|---|---|
| 3,525,002 | 8/1970 | Mattson et al. | 310/88 |
| 3,719,843 | 3/1973 | Dochterman | 310/88 |
| 4,086,507 | 4/1978 | Bruno | 310/88 |
| 4,220,880 | 9/1980 | Roland et al. | 310/88 |
| 4,631,433 | 12/1986 | Stokes | 310/89 |
| 4,931,681 | 6/1990 | Spaggiari | 310/89 |
| 4,945,270 | 7/1990 | Okamoto | 310/88 |
| 4,994,699 | 2/1991 | Shiina | 310/88 |
| 5,006,742 | 4/1991 | Strobl et al. | 310/88 |
| 5,019,737 | 5/1991 | Woodard | 310/89 |
| 5,298,824 | 3/1994 | Franz | 310/89 |
| 5,311,090 | 5/1994 | Ferlatte | 310/88 |
| 5,818,136 | 10/1998 | Matsumoto | 310/88 |

*Primary Examiner*—Nestor Ramirez
*Assistant Examiner*—Thanh Lam

[57] ABSTRACT

A form fitting motor cover (1) for TEFC motors having a cylindrical body with a periphery of 255 degrees which when flexed outwardly can be placed over a motor (4) casing and upon release will cause said cover to adhere to, and form around said motor casing to keep debris, splash and spray off of motor casing and improve efficiency of air flowing between the cover and the motor cooling fins (6). The motor cover has at either or both ends of the motor an attachable covering end plate (3) and a conduit box cover (2) which can be attached to the cover by any suitable method.

4 Claims, 3 Drawing Sheets

COVERING DEVICE FOR TOTALLY ENCLOSED FAN COOLED MOTORS

BACKGROUND

1. Field of the Invention

This invention relates to Totally Enclosed Fan Cooled (TEFC) electric motors, particularly to a form-fitting device for substantially covering TEFC motors to thereby reduce exposure to chemicals, spray, moisture, splash, air-borne and other forms of debris and enhance motor efficiency through improved cooling system airflow.

2. Description of Prior Art

Typically, TEFC motors employed in the pulp and paper, textile, petrochemical, mining, lumber and other process industries are subjected to conditions detrimental to the motor life and operation. Such motors are placed in environments where moisture, splash, spray, and air borne debris regularly block the motor cooling system consisting of air intake fan protected by an outer grill, and cooling fins along the length of the motor housing. Such blockage has been proven to dramatically reduce motor life and diminish motor performance and efficiency. Such blockage has been proven to cause higher maintenance costs, higher energy usage, reduced load capacity, shortens bearing and winding life, and causes costly production disruptions and motor replacements all of which are very non-productive and costly to industry.

Daily conditions and immediate needs in most industrial situations place tremendous time constraints on maintenance personnel. Inventions that address such realities are more likely to be adopted and utilized as envisioned by the inventor. Previous attempt to address the problems associated with adverse industrial conditions typically involved haphazard, temporary solutions such as rubber mats thrown over motors to expensive, fabricated steel housings specially crafted to cover a motor. All of these prior devices attempt to serve a singular purpose of protecting a motor from various elements and all are also generally undesirable in practice, insufficient in function and may actually be harmful to the motor. The present invention involves a device that can be installed and removed without any tools or additional assistance.

Various inventors have attempted to address the problem of protecting motors from various elements but none have proposed a device, as proposed by the present invention, that protects a majority of the motor, addresses motor efficiency, and recognizes personnel maintenance time issues relative to the actual application of the invention.

The prior art has attempted to either address or circumvent some of the problem with various forms of enclosures yet most require tools and substantial time for application thereby limiting their application and do not adequately protect the entire motor cooling system. The prior art is limited to only protecting portions of motors from the problem but do not address or attempt to improve motor efficiency under both adverse and non-adverse conditions. The most comprehensive prior art to protect the motor cooling system is U.S. Pat. No. 5,311,090 (Expired).

The patentee of U.S. Pat. No. 5,311,090 (Expired) discloses a two (2) piece device consisting of a fan enclosure which can be attached to a shield encompassing a portion of the motor thereby protecting the upper surface areas of the motor from harmful elements. Such a device only partially addresses the problems associated with blockage of the motor cooling system by exposing the sides of the motor to harmful chemicals and debris, splash and spray originating from all points other than directly above the motor. Such device also requires the use of tools, and external means of attachment and does not account for actual situations in most industrial environments where maintenance personnel time is very limited thereby rendering its application to only the absolute worst of situations. In addition, to the aforementioned, the partial periphery of the cover device confines cooling airflow to only a portion of the motor shell subjecting the unexposed sides of the motor to potentially diminished airflow thereby allowing heat accumulation which leads to diminished efficiency and increased energy usage.

U.S. Pat. No. 4,220,880 describes an adjustable motor cover designed to protect outdoor motors from sun and rain. This reference although providing a motor covering and protection from various elements does not provide adequate ventilation or clearance in many motor installations and essentially places the motor in an oven-like structure thereby hastening the motor demise. This reference also appears to require that a motor be actually mounted to the cover itself. Such a requirement would render the cover useless in most indoors manufacturing applications whereby motors must be mounted to a specific base and coupled to an appurtenance such as a pump or pulley. Additionally the mounting requirement would preclude its use on many TEFC motors whose weight and load requirements would far exceed the support capacity of the referenced drawing. Further, this reference may actually reduce, in some situations, motor efficiency. The present invention provides protection from sun, rain, ambient temperature, is applicable indoors or outdoors, and reduces losses in motor efficiency caused by heat.

U.S. Pat. No. 5,006,742 discloses a splash-proof cover for an electric motor with an electrical socket connection. Such cover only provides a splash type cover and does not address fan intake areas, or substantially protect the motor cooling surface areas along the motor housing. In addition, said cover does not attempt to address motor efficiency gains through improved cooling.

Additional prior art generally within the field of the present invention includes U.S. Pat. Nos. 4,631,433, 3,719, 843, 4945,270 and 4,931,681.

OBJECTS AND ADVANTAGES

In view of the prior art and general requirements and practices in industry, there exists a need for a protective device for motors that is readily applicable and available and suitable for use in heavy duty environments where gains in motor efficiency, motor life and reduced energy usage and maintenance expense is needed.

Besides the objects and advantages of the form-fitting motor covering device described in the present invention, several objects and advantages of the present invention are:

(a) to provide a motor covering device which can be mass produced according to published frame standards and applied in any industrial application;

(b) to provide a motor covering device that can be installed, removed and reinstalled individually without the use of tools or mechanical means;

(c) to provide a motor covering device that is form fitting to the actual motor thereby eliminating the need, or use of, additional means of attachment;

(d) to provide a motor covering device that is made of such material which is non-conductive to static or direct electricity, possesses fire and chemical resistant properties, possesses elastomeric properties to form to the particular motor application, and which can withstand high direct and ambient temperatures without substantially weakening structural quality;

(e) to provide a motor covering device which can be colored according to OSHA or end-user specifications;

(f) to provide a motor covering device which encompasses and protects a majority of the motor surfaces which make up the cooling system of the motor;

(g) to provide a motor covering device that conforms to the periphery and outer dimensions of the motor thereby confining cooling airflow within actual cooling surfaces to increase the cooling effect and enhance the motor efficiency and operation;

(h) to provide a motor covering device which serves as a shield against sunlight and heat thereby reducing the effect of ambient heat on a motor while enhancing the cooling effect of air flowing through the motors cooling fins;

(i) to provide a motor covering device incorporating an end shield attachment at the motor fan end of the motor that protects the fan and fan air intake areas from blockage and other airborne impacts;

(j) to provide a motor covering device incorporating an end shield attachment made of the same material as the device or a porous material which does not restrict airflow to the motor cooling fins via the motor fan and fan air intake.

(k) to provide a motor covering device allowing a shield to be attached at the bearing end of the motor that protects the shaft and bearing areas from spray and other impacts;

Figure 1:
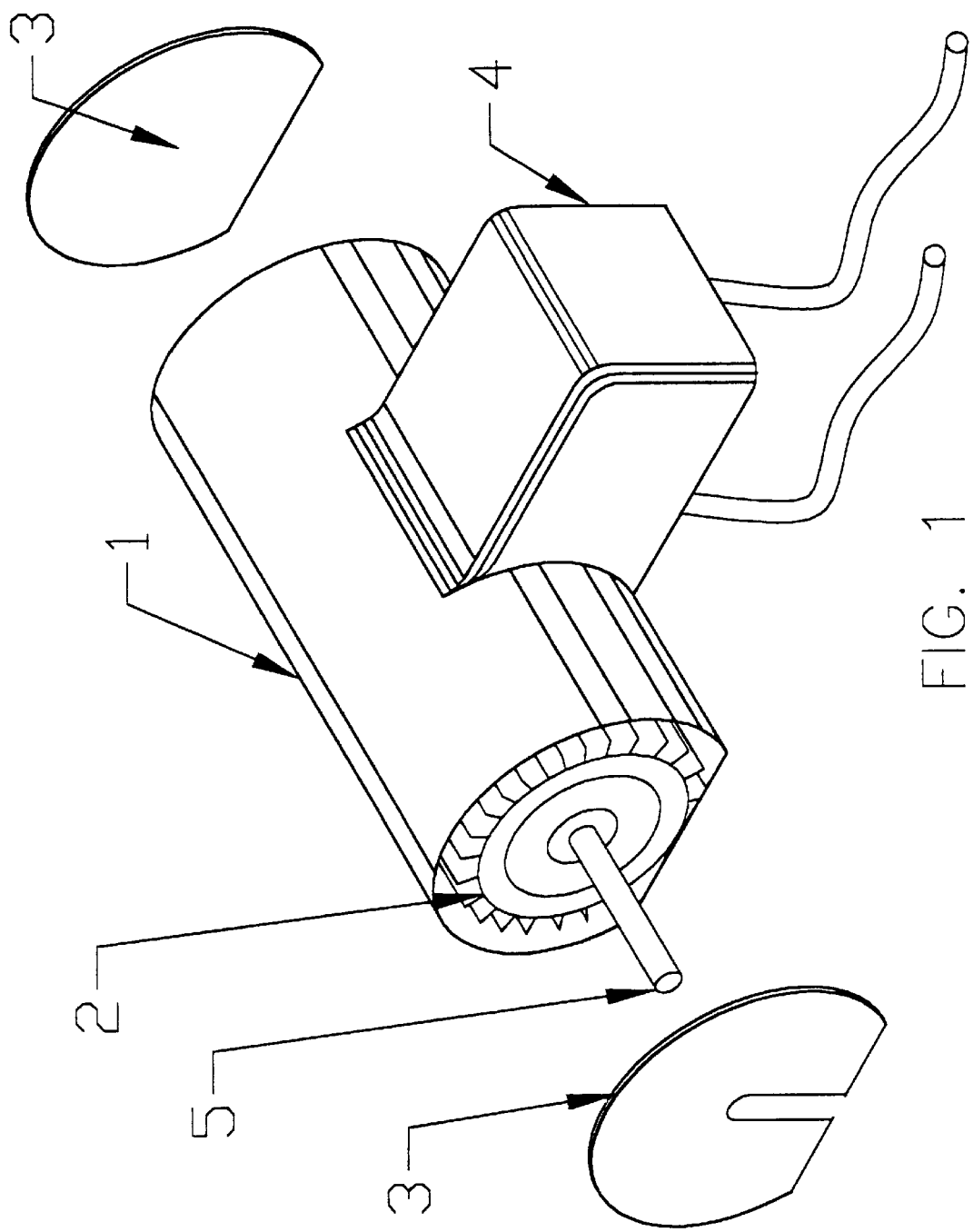
FIG. 1: is a perspective view of the motor cover device, showing the typical; installation position over the motor, and illustrating the attachment of a conduit box cover as viewed from the shaft end of the motor.

REFERENCE NUMERALS IN THE DRAWINGS:

| | |
|---|---|
| 1 motor protection device | 2 TEFC motor |
| 5 motor shaft | 7 motor air intake fan |
| 6 motor cooling fins | 8 motor junction box |
| 4 conduit box cover device | 3 end splash guard |

SUMMARY

In with the present invention a motor protection devise comprises a cylindrical body, longer than a motor, with a periphery of 255 degrees, an attachable end plate splash guard and an attachable conduit box cover.

DETAILED DESCRIPTION OF THE DRAWINGS

Referencing now to the drawings FIG. 1 illustrates a perspective view of the motor cover device generally represented by numeral (1) as positioned about a motor (2). Generally the motor (2) includes a shaft (5) at one end, an air intake fan (7) enclosed within a protective housing at the opposite end, cooling fins (6) positioned longitudinally along the motor exterior, and a junction box (8) is provided to enclose the electrical connection of the motor to an external power source.

Generally the motor cover device (1) will conform to the outer diameter of the motor (2) as a means to confine air-flow to within the cooling fins (6) comprising the outer shell of the motor and to prevent contaminants from contact with the outer shell of the motor. The motor cover device will extend beyond the length of the motor itself so as to substantially reduce inadvertent entry of contaminants into the motor enclosure. Mounting of the present invention requires no bolts, straps or other means of positive fixation. The cover device is expanded by hand, placed over the motor and upon release contracts back to its original size and conforms to the outer diameter of the motor such that the inward pressure of the cover device is sufficient to hold it against the outer shell of the motor. The present invention herein is particularly useful in protecting the outer surfaces and specifically the spaces between the cooling fins from overhead spills or spray and splash emanating from other directions as a means to alleviate the detrimental effects of debris accumulation between the longitudinal fins thereof This configuration eliminates the collection of debris on the motor. An end plate, or splash guard (3) can be attached at either, or both ends of the motor cover device to provide additional protection of fan and/or bearings from directional spray, splash and other external impacts.

An optional conduit box cover device (4) is available as a means to protect the electric junction box and vital electrical connections to the motor from spray, splash and other external impacts.

Figure 2:
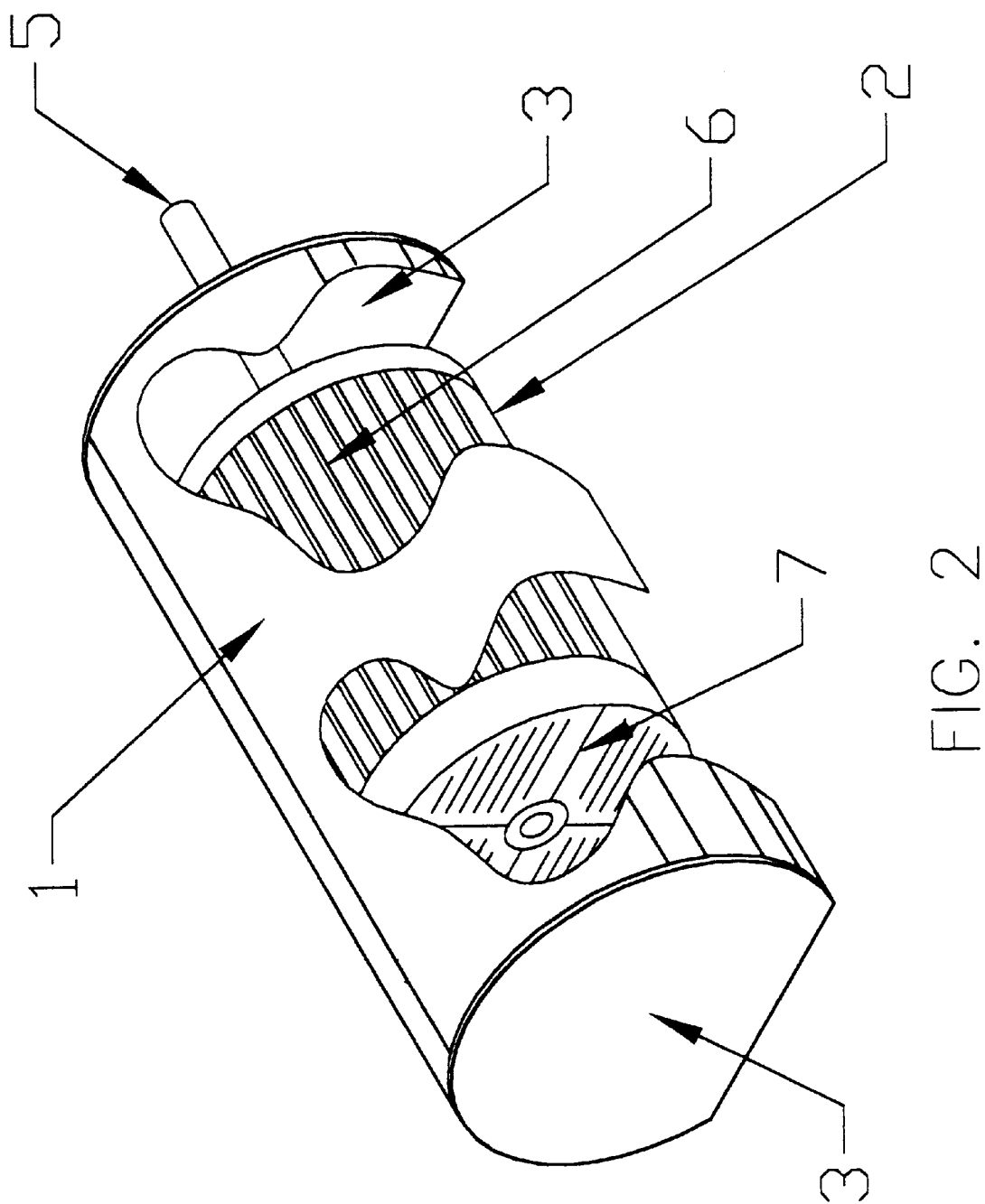
FIG. 2: is a fragmentary sectional view of the air-intake end of the motor showing a partial cut-away view of the air intake splash shield in typical installation position over the motor.
Figure 3:
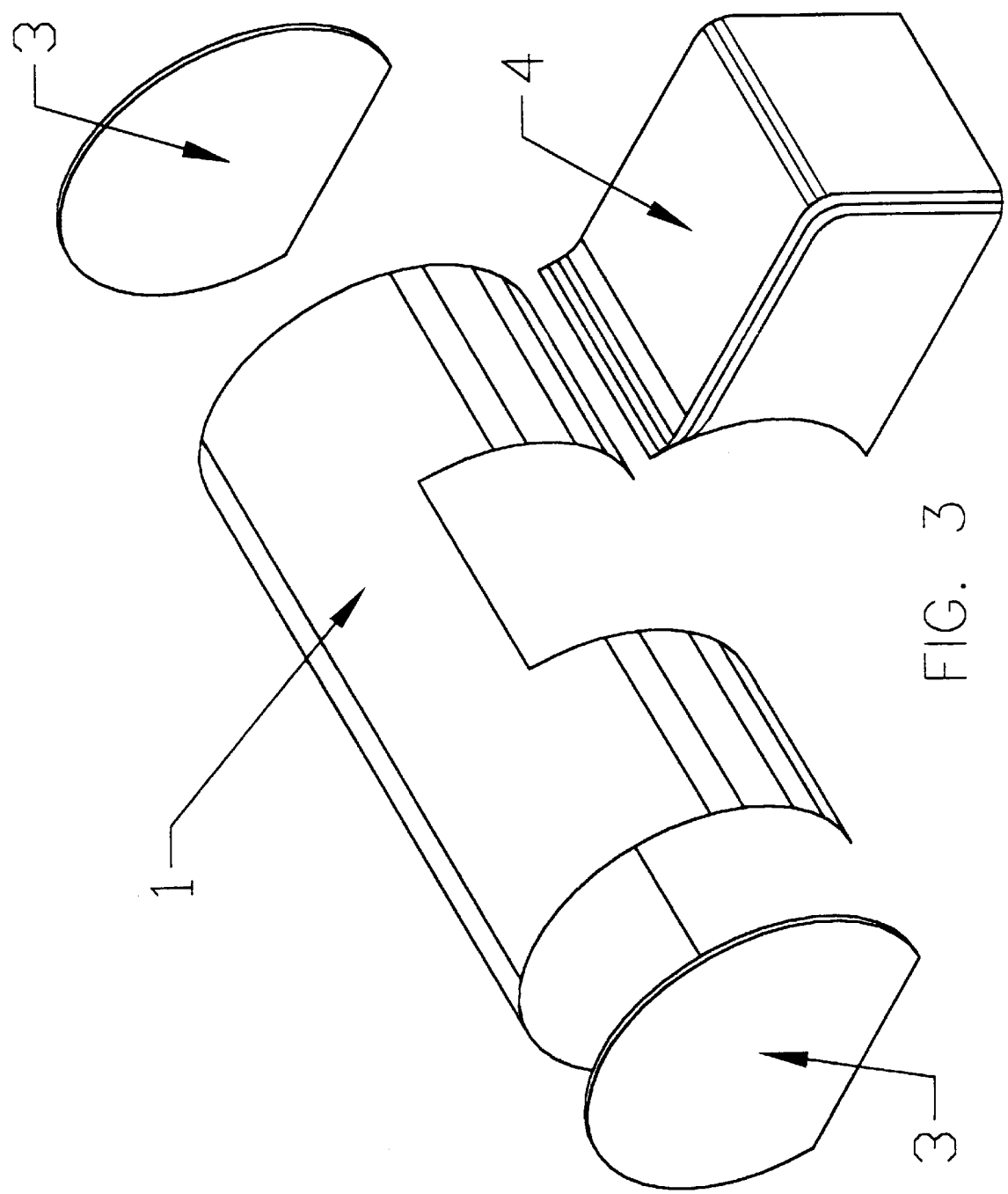
FIG. 3: is a perspective view of the motor cover incorporating splash shields at both ends and separate conduit box attachment.

FIG. 2 illustrates the second embodiment of the present invention whereby one end of the motor cover device (1) will incorporate an end plate splash guard (3) as means to protect intake fan from splash, spray and airborne debris. The end plate splash guard (3) shall be attached to the motor cover device (1) by any suitable means. The end plate splash guard shall conform the diameter of the motor cover device. The embodiment described herein is particularly useful in protecting the air intake fan screen from blockage. This arrangement results in a maximum amount of unblocked screen area to permit the motor to draw cooling air more efficiently and with greater volume.

The whole arrangement of cover and end splash guard means to allow the motor to draw more air into the intake fan and to channel and confine airflow to and through the motor cooling fins resulting a measurable increase in the motors capacity to push heat away thereby reducing overall motor temperature.

Although specific embodiments of the present invention have been described above, it is not limited thereto and it will be apparent to those skilled in the art that numerous modifications form part of the present invention insofar as they do not depart from the spirit, nature and scope for the claimed described invention.

What is claimed is:

1. A fabricated form fitting motor protection device that adheres to a fan cooled electric motor having a casing, a fan external to said casing at one end for circulating cooling air over said casing, and a shaft extending from said casing at the other end, said device comprising:

a cylindrical enclosure device the periphery which shall total 225 degrees with both ends open;

the entire device being separate from the casing surrounding a majority of the circumference of the casing and extending longitudinally over the casing, said enclosure being longer that the casing and spaced from the casing to define an air passage over the casing.

2. Said device as defined in claim 1 wherein said enclosure requires no positive means of fixation being easily installed and removed the purpose of which means to protect the motor casing from falling contaminants and debris that block air intake screens and cooling fins, said device channeling airflow to motor cooling fins with the intent to reduce motor temperature, lower motor maintenance requirements, extend motor bearing, grease, and winding life and generally improve motor reliability.

3. The device as defined in claim 1 wherein said enclosure can include an attachable flat end wall of the same periphery of said enclosure associated herewith means to protect motor ends from airborne debris and spray.

the end plate device attachment can be made of a porous or other material where passage of air to motor areas is required.

4. The device as defined in claim 1 wherein said enclosure can include an attachable electrical connection box protection box for attachment to the periphery of the enclosure means to protect electrical connections to said motor associated herewith.

\* \* \* \* \*